(12) United States Patent
Tu

(10) Patent No.: US 8,346,313 B2
(45) Date of Patent: Jan. 1, 2013

(54) DYNAMIC WARM-UP TIME FOR A WIRELESS DEVICE IN IDLE MODE

(75) Inventor: Alex Kuang-Hsuan Tu, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 1176 days.

(21) Appl. No.: 11/498,011

(22) Filed: Aug. 1, 2006

(65) Prior Publication Data
US 2008/0032662 A1 Feb. 7, 2008

(51) Int. Cl.
*H04B 1/38* (2006.01)
*H04B 1/16* (2006.01)
*H04M 1/00* (2006.01)

(52) U.S. Cl. .................. 455/574; 455/127.5; 455/343.2; 455/343.4

(58) Field of Classification Search .... 455/343.1–343.5, 455/574, 127.1, 127.5, 181.3, 515
See application file for complete search history.

(56) References Cited

U.S. PATENT DOCUMENTS

| | | | |
|---|---|---|---|
| 6,735,454 B1 * | 5/2004 | Yu et al. | 455/574 |
| 6,965,763 B2 * | 11/2005 | Bussan et al. | 455/343.4 |
| 7,295,827 B2 | 11/2007 | Liu et al. | |
| 7,372,818 B2 * | 5/2008 | Fraser et al. | 370/252 |
| 7,474,887 B2 * | 1/2009 | Chandra et al. | 455/343.2 |
| 7,512,423 B2 * | 3/2009 | Karaoguz | 455/574 |
| 7,526,257 B2 * | 4/2009 | Ogura | 455/78 |
| 7,684,832 B2 * | 3/2010 | Heinle et al. | 455/574 |
| 7,894,862 B2 * | 2/2011 | Hwang et al. | 455/574 |
| 2003/0185162 A1 | 10/2003 | Fraser et al. | |
| 2005/0245215 A1 | 11/2005 | Abhishek et al. | |
| 2007/0093231 A1 * | 4/2007 | Abhishek et al. | 455/343.4 |
| 2009/0257368 A1 * | 10/2009 | Aad et al. | 370/311 |

FOREIGN PATENT DOCUMENTS

| | | |
|---|---|---|
| EP | 1592272 | 11/2005 |
| GB | 2415573 | 12/2005 |
| JP | 2005323369 A | 11/2005 |
| KR | 20060045867 | 5/2006 |
| WO | 0072615 | 11/2000 |
| WO | 0133870 | 5/2001 |

OTHER PUBLICATIONS

International Search Report—PCT/US07/074510, International Search Authority—European Patent Office—Dec. 28, 2007.
Written Opinion—PCT/US2007/074510, International Search Authority, European Patent Office, Dec. 28, 2007.
Taiwan Search Report—TW096128267—TIPO—Mar. 15, 2011.

* cited by examiner

*Primary Examiner* — Pablo Tran
(74) *Attorney, Agent, or Firm* — Kevin T. Cheatham

(57) ABSTRACT

Techniques for dynamically selecting warm-up time for a wireless device operating in the idle mode are described. At each active interval, conditions affecting warm-up of the wireless device at a next active interval are determined. The conditions may pertain to channel conditions, operating conditions, and/or hardware configuration. A warm-up time is selected based on the determined conditions. A wake-up time for the next active interval is determined based on the selected warm-up time. The wireless device then goes to sleep until the wake-up time. In one scheme, the strongest pilot acquired in each active interval is identified, and its pilot strength is averaged to obtain an average pilot strength. The average pilot strength is compared against at least one threshold, and one of at least two possible time durations is selected for the warm-up time based on the comparison result.

44 Claims, 5 Drawing Sheets

DYNAMIC WARM-UP TIME FOR A WIRELESS DEVICE IN IDLE MODE

BACKGROUND

I. Field

The present disclosure relates generally to communication, and more specifically to techniques for receiving data at a wireless device in an idle mode.

II. Background

A wireless device (e.g., a cellular phone) in a wireless communication system may operate in one of several modes, such as "active" and "idle", at any given moment. In the active mode, the wireless device may actively exchange data with one or more base stations in the system, e.g., for a voice and/or data call. In the idle mode, the wireless device may monitor a paging channel for messages applicable to the device. Such messages may include page messages that alert the wireless device to the presence of an incoming call and overhead messages that carry system and other information for the device.

In the idle mode, the wireless device continues to consume power to sustain circuitry used to process the paging channel. The wireless device may be portable and powered by an internal battery. Power consumption by the wireless device in the idle mode decreases the available battery power, which then shortens the standby time between battery recharges and the talk time when a call is placed or received. Therefore, it is highly desirable to minimize power consumption in the idle mode in order to increase battery life.

There is therefore a need in the art for techniques to operate in a power efficient manner in the idle mode.

SUMMARY

Techniques for dynamically selecting warm-up time for a wireless device operating in the idle mode are described herein. The warm-up time may be selected based on one or more conditions affecting warm-up of the wireless device. The conditions may relate to channel conditions (which may impact pilot acquisition time), operating conditions (which may determine the specific tasks to perform), hardware configuration, and so on. The techniques allow for use of a shorter warm-up time in many cases, which reduces power consumption in the idle mode.

In an embodiment of operating a wireless device with dynamic warm-up time, conditions affecting warm-up of the wireless device at a next active interval are determined. The conditions may pertain to channel conditions, operating conditions, hardware configuration, and so on, or any combination thereof. The next active interval may correspond to a paging indicator (PI) bit on a quick paging channel (QPCH), a paging slot on a paging channel (PCH), and so on. A warm-up time is selected based on the determined conditions. A wake-up time for the next active interval is determined based on the selected warm-up time. The wireless device then sleeps until the wake-up time. In an embodiment, the strongest pilot acquired in each active interval is identified, and its pilot strength is averaged to obtain an average pilot strength. The average pilot strength is compared against at least one threshold, and one of at least two possible time durations is selected for the warm-up time based on the result of the comparison.

Various aspects and embodiments of the invention are described in further detail below.

BRIEF DESCRIPTION OF THE DRAWINGS

Aspects and embodiments of the invention will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The dynamic warm-up techniques described herein may be used for various wireless communication systems such as Code Division Multiple Access (CDMA) systems, Time Division Multiple Access (TDMA) systems, and Frequency Division Multiple Access (FDMA) systems. The terms "system" and "network" are often used interchangeably. A CDMA system may implement a radio technology such as cdma2000, Wideband-CDMA (W-CDMA), and so on. cdma2000 covers IS-2000, IS-95, and IS-856 standards. A TDMA system may implement a radio technology such as Global System for Mobile Communications (GSM), Digital Advanced Mobile Phone System (D-AMPS), and so on. These various radio technologies and standards are known in the art. W-CDMA and GSM are described in documents from an organization named "3rd Generation Partnership Project" (3GPP). cdma2000 is described in documents from an organization named "3rd Generation Partnership Project 2" (3GPP2). 3GPP and 3GPP2 documents are publicly available.

For clarity, the techniques are described below for cdma2000. In the cdma2000 family of standards, IS-2000 Releases 0 and A are commonly referred to as CDMA2000 1X (or simply, 1X), IS-2000 Release C is commonly referred to as CDMA2000 1xEV-DV (or simply, 1xEV-DV), and IS-856 is commonly referred to as CDMA2000 1xEV-DO (or simply, 1xEV-DO).

Figure 1:
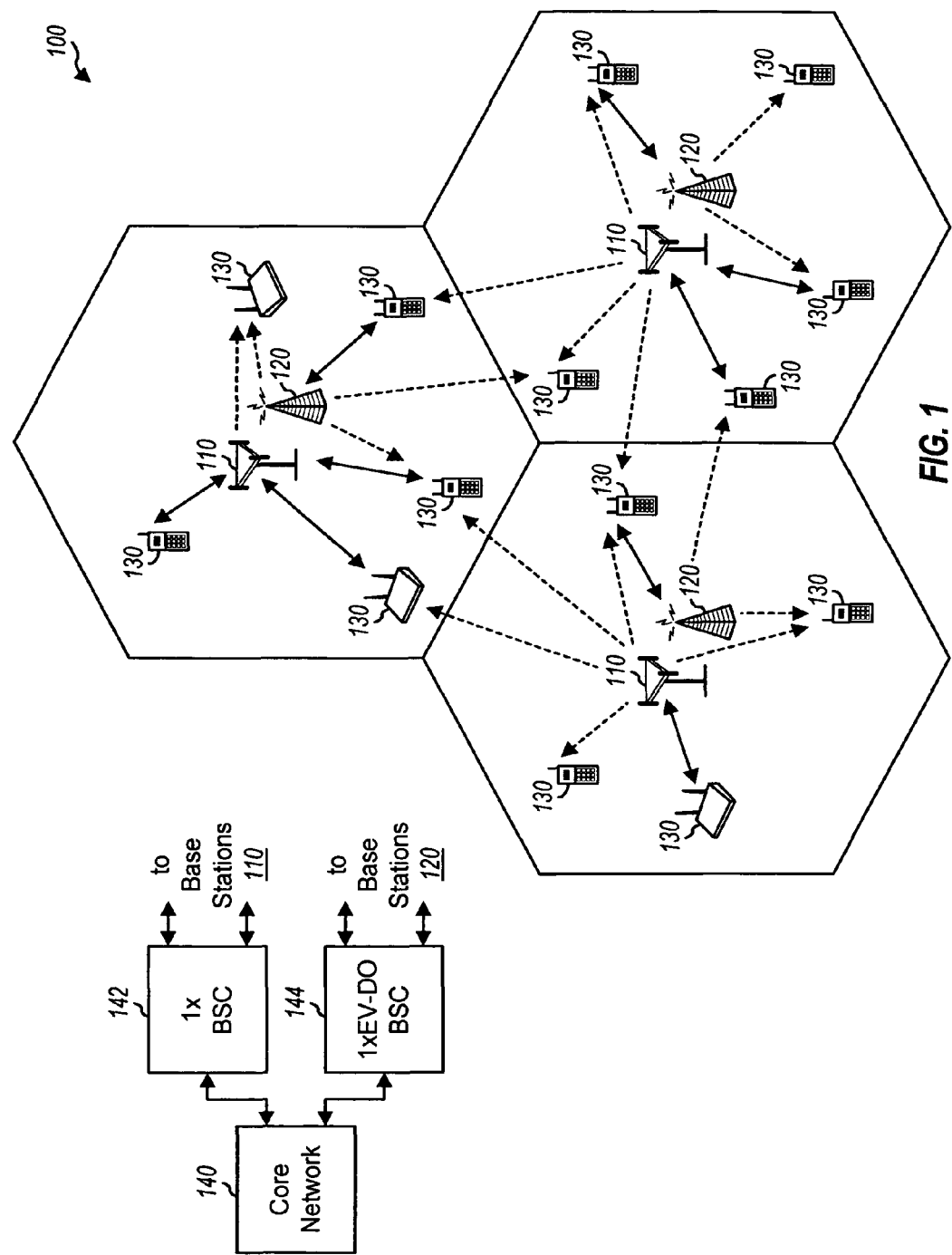
FIG. 1 shows a deployment of a 1X system and a 1xEV-DO system.

FIG. 1 shows an exemplary deployment 100 with a 1X system and a 1xEV-DO system. The 1X system includes base stations 110 that provide voice and packet data services for wireless devices 130 located within the coverage area of these base stations. Similarly, the 1xEV-DO system includes base stations 120 that provide packet data service for wireless devices 130 located within the coverage areas of these base stations. Base stations 110 and 120 may be located at different sites or co-located at the same sites. A base station controller (BSC) 142 couples to base stations 110 and provides coordination and control for these base stations. Similarly, a BSC 144 couples to base stations 120 and provides coordination and control for these base stations. BSCs 142 and 144 may further couple to a core network 140 that supports communication between the 1X and 1xEV-DO systems.

In general, a base station (1X terminology) is a fixed station that communicates with the wireless devices and may also be called an access point (1xEV-DO terminology), a Node B, a base transceiver station (BTS), or some other terminology. A wireless device may be stationary or mobile and may also be called a mobile station (1X terminology), an access terminal (1xEV-DO terminology), a user equipment, or some other terminology. A wireless device may be a cellular phone, a personal digital assistant (PDA), a subscriber unit, a wireless modem, a terminal, and so on. In the description herein, the term "base station" is used generically for a fixed station, and the term "wireless device" is used for a device that communicates with the fixed station. A wireless device may be capable of communicating with multiple systems, e.g., the 1X and 1xEV-DO systems.

In FIG. 1, a solid line with arrows on both ends indicates communication between a wireless device and a base station. A dashed line with an arrow on one end indicates reception of pilot and/or signaling (e.g., pages) by a wireless device from a base station. A wireless device may communicate with one or multiple base stations on the forward link and/or reverse link at any given moment. The forward link (or downlink) refers to the communication link from the base stations to the wireless devices, and the reverse link (or uplink) refers to the communication link from the wireless devices to the base stations.

A wireless device may register with the 1X system and may operate in an idle mode when the device is not actively exchanging data with any base station in the 1X system. In the idle mode, the wireless device may monitor a quick paging channel (QPCH) and a paging channel (PCH) from the 1X system. The QPCH indicates whether a page message might be sent to the wireless device on the PCH. The PCH carries page messages. The wireless device can detect the QPCH more quickly and typically processes the PCH only if the QPCH indicates that a page message might be sent to the wireless device.

Figure 2:
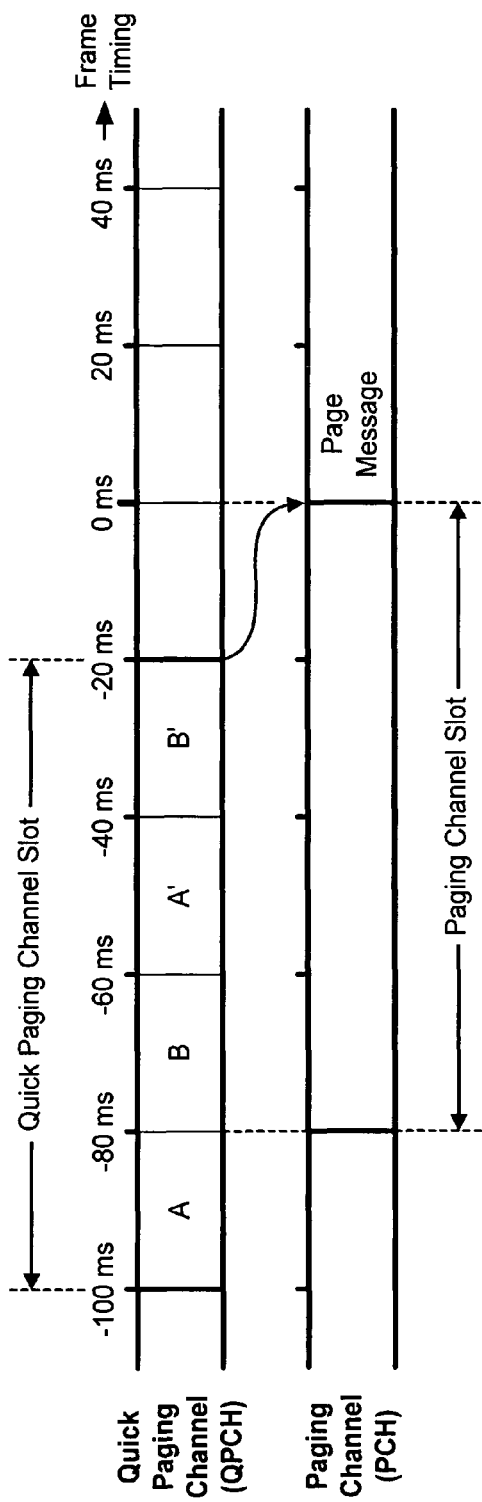
FIG. 2 shows a QPCH and a PCH in the 1X system.

FIG. 2 shows the QPCH and PCH in the 1X system. The PCH carries page messages and other information for idle wireless devices, which are wireless devices that have registered with the system but are in the idle mode. Because a page message may be sent at any time and may be relatively long, continual monitoring of the PCH for page messages may significantly deplete battery power in the idle mode. The QPCH and PCH are designed such that the idle wireless devices only need to be active for a small portion to the time to receive page messages.

The PCH is partitioned into PCH slots. Each PCH slot has a duration of 80 milliseconds (ms) and is further partitioned into four 20 ms frames. Each idle wireless device is assigned PCH slots that are spaced apart by a time interval $T_{PCH}$, which is determined by a slot cycle index (SCI) applicable to the wireless device. The specific PCH slots assigned to each wireless device are determined by identification information for the wireless device. This identification information may be an International Mobile Subscriber Identifier (IMSI) that is unique for each wireless device, a Mobile Identification Number (MIN), an Electronic Serial Number (ESN), a Temporary Mobile Subscriber ID (TMSI), and so on. More than one wireless device may be assigned a given PCH slot.

The QPCH is partitioned into QPCH slots. Each QPCH slot also has a duration of 80 ms and is associated with one PCH slot that starts 100 ms after the QPCH slot. Each QPCH slot is further partitioned into four frames that are labeled as A, B, A', and B'. Each frame carries 192 paging indicator (PI) bits for full rate or 96 PI bits for half rate. Each PI bit is transmitted with On/Off keying, with '0' representing Off and '1' representing On.

Each idle wireless device is assigned two PI bits in each assigned QPCH slot. The assigned QPCH slots are QPCH slots starting 100 ms before the assigned PCH slots. The position of each assigned PI bit is determined by a hashing function and changes from bit to bit. The pair of assigned PI bits for each assigned QPCH slot are sent such that either (1) the first PI bit is sent in frame A and the second PI bit is sent in frame A' or (2) the first PI bit is sent in frame B and the second PI bit is sent in frame B'. This transmission scheme ensures that the two PI bits are separated by at least 20 ms, and that the second PI bit arrives at least 20 ms before the start of the associated PCH slot. The QPCH is used in conjunction with the PCH and functions like a control channel for the PCH. The PI bits in each QPCH slot are quick paging signals that alert the wireless devices that a page message is about to be sent in the associated PCH slot.

When a base station sends a page message to a wireless device on the PCH (or requires the wireless device to wake up to receive new configuration information), the base station turns "On" both PI bits in the QPCH slot assigned to the wireless device. Since more than one wireless device may hash/map to any given PI bit, detecting the assigned PI bits as On does not mean that the wireless device will actually receive a page message (or configuration information) in the associated PCH slot. However, the wireless device may interpret a PI bit that is detected as Off to mean that the wireless device does not need to process the associated PCH slot. The wireless device may then power down after processing the PI bits, without processing the PCH, which may reduce power consumption.

Figure 3:
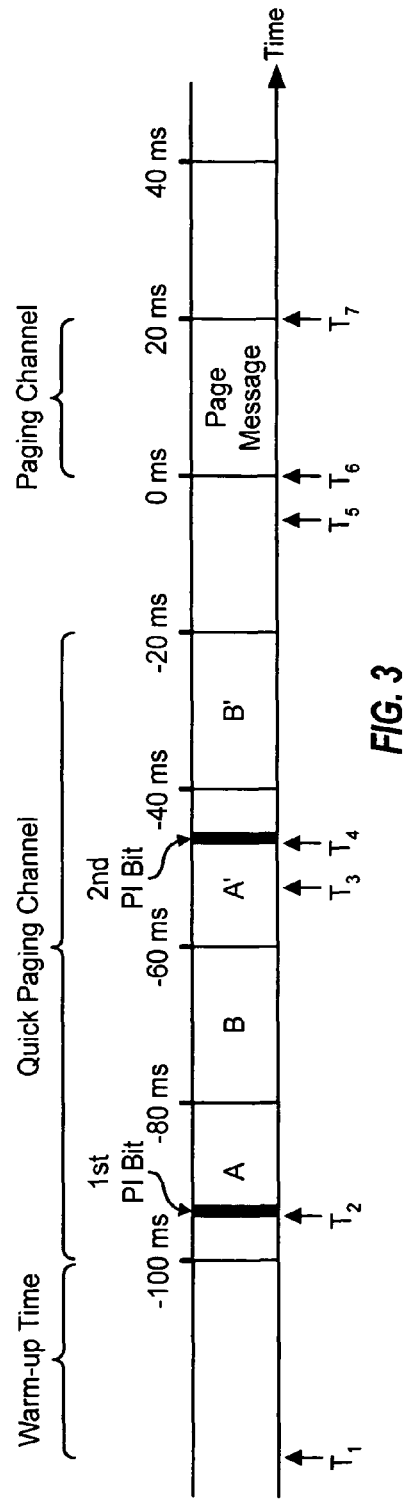
FIG. 3 shows an exemplary timeline for processing the QPCH and PCH.

FIG. 3 shows an exemplary timeline for processing the QPCH and PCH. At time $T_1$, the wireless device wakes up for its first PI bit in an assigned QPCH slot and performs warm-up tasks for receiving the QPCH. The wireless device then detects the first PI bit at time $T_2$. If the first PI bit is detected as Off, indicating that no page message will be sent to the wireless device in the next PCH slot, then the device may sleep until the first PI bit in the next assigned QPCH slot. Otherwise, the wireless device may go to sleep after detecting the first PI bit, wake up at time $T_3$ prior to its second PI bit, and perform warm-up tasks for receiving the QPCH. The wireless device then detects the second PI bit at time $T_4$. If the second PI bit is detected as Off, then the wireless device may sleep until the first PI bit in the next assigned QPCH slot. Otherwise, the wireless device may go to sleep after detecting the second PI bit, wake up at time $T_5$ prior to the PCH slot, and perform warm-up tasks for receiving the PCH. The wireless device then processes the PCH at time $T_6$ and recovers a page message sent on the PCH. If the wireless device does not need to continue processing the PCH or to perform any other actions, then the wireless device may go to sleep at time $T_7$ until the next wake-up time.

The wireless device may perform various tasks for warm-up prior to processing the QPCH or PCH. The warm-up tasks may include the following:

power on a temperature compensated crystal oscillator (TCXO),
power on pertinent digital circuit blocks,
switch a processor from a sleep clock to a TCXO clock,
power on a high-speed oscillator and lock it to the TCXO,
switch the processor from the TCXO clock to a high-speed clock,
reboot software,
download program code from an external memory to an internal memory,
turn on receiver circuitry,
acquire pilots and select one base station for processing,
assign fingers to signal instances (or multipaths) of the selected base station, and
acquire timing and frequency of each multipath.

The wireless device may power down as much circuitry as possible during sleep in order to conserve battery power. The wireless device may power up pertinent analog and digital circuit blocks upon waking up from sleep and perform various tasks to configure these circuit blocks. For example, the wireless device may restore boot-up software, download program code, restore hardware states, and so on.

The wireless device may operate various oscillators such as a low rate (e.g., 32 KHz) sleep oscillator, an accurate medium rate (e.g., 19.2 MHz) TCXO, a high-speed (e.g., 200+ MHz) oscillator, and so on. The sleep clock may be used for digital circuitry that is powered on during sleep. The TCXO may provide a reference frequency for the high-speed oscillator as well as radio frequency (RF) oscillators used for frequency upconversion and downconversion. The high-speed clock may be used for digital circuit blocks to achieve greater processing capability.

An exemplary set of warm-up tasks is given above. In general, a wireless device may perform any set of tasks for warm-up. The specific tasks to be performed may be dependent on the design of the wireless device, the system being received, and/or other factors. Some tasks may be performed in a parallel while other tasks may be performed in a suitable order so that the overall warm-up time is reduced.

The warm-up tasks may be considered as including configuration tasks and processing tasks. The configuration tasks include tasks to configure the hardware, firmware, and/or software at the wireless device. The processing tasks include tasks to process a desired transmission, e.g., the QPCH and/or PCH. In the exemplary list given above, the processing tasks may include pilot acquisition, finger assignment, and timing and frequency acquisition. The configuration tasks may include the remaining tasks.

The amount of time required for each warm-up task may be dependent on various factors. For example, the amount of time required for a configuration task may be dependent on hardware design, capability, and availability. The amount of time required for a processing task may be dependent on channel conditions and/or other factors.

The total amount of time allocated for warm-up is typically selected based on worst-case scenario. For example, the amount of time allocated for configuration tasks may be selected based on the worst-case hardware configuration for all wireless device models. The amount of time allocated for processing tasks may be selected based on the worst-case channel conditions. A wireless device may be programmed with a fixed and long warm-up time. The wireless device may compute its sleep time such that it wakes up by the programmed warm-up time prior to its assigned QPCH or PCH slot. The long programmed warm-up time ensures that the wireless device will be ready prior to its assigned QPCH or PCH slot even in the worst-case scenario. However, the wireless device does not observe the worst-case scenario in many instances and may be able to complete warm-up in a shorter amount of time than the programmed warm-up time. In these instances, the wireless device wakes up earlier and is active for a longer time period than necessary.

In an embodiment, warm-up time for a wireless device is dynamically selected based on one or more conditions affecting warm-up of the wireless device. The conditions may also be referred to as factors, parameters, and so on. Table 1 lists some exemplary conditions that may be used to determine warm-up time and a short description for each type of conditions.

TABLE 1

| Conditions | Description |
|---|---|
| Channel conditions | Factors affecting signal processing time, e.g., pilot strength. |
| Operating conditions | Factors affecting warm-up tasks, e.g., switching frequency band, type of control channel to receive, etc. |
| Hardware configuration | Factors affecting processing capability, e.g., memory type, processor speed, capability and availability. |
| Miscellaneous | Other factors affecting warm-up. |

Channel conditions may affect the amount of time required for warm-up. In general, pilot acquisition may be performed in a shorter amount of time for good channel conditions. The wireless device may monitor the channel conditions during each active interval and may select the warm-up time for the next active interval based on the channel conditions detected in the current active interval.

The wireless device may maintain a candidate list of N best pilots detected during a given active interval, where N may be equal to 3, 4 or some other value. Each pilot corresponds to a different base station and, in cdma2000, is associated with a specific offset of a pseudo-random number (PN) sequence. The wireless device may store the candidate list prior to going to sleep. At the next active interval, the wireless device may attempt acquisition on the pilots in the candidate list. The wireless device only needs to process the QPCH and PCH from one base station while in the idle mode. However, the wireless device may acquire all N pilots in the candidate list to determine the strongest pilot and may then process the QPCH and PCH from the base station with the strongest pilot. The wireless device may perform a search for pilots if the pilots in the candidate list are not found or are too weak for reliable reception of the QPCH and PCH.

The wireless device may determine the channel conditions based on various parameters. In an embodiment, the channel conditions are determined based on pilot strength. In each active interval, the wireless device may acquire one or more pilots, measure the strength of each acquired pilot, and identify the strongest pilot. The wireless device may then average the pilot strength of the strongest pilot across different active intervals to obtain an average pilot strength, as follows:

$$P_{avg}(n) = \alpha \cdot P_{avg}(n-1) + (1-\alpha) \cdot P(n), \qquad \text{Eq (1)}$$

where

P(n) is the strongest pilot strength for active interval n, $P_{avg}(n)$ is the average pilot strength for active interval n, and α is a factor that determines the amount of averaging.

Equation (1) is for an infinite impulse response (IIR) filter. A small α corresponds to less averaging, and a large a corresponds to more averaging. The averaging may also be performed with some other type of filter.

Different warm-up durations may be used for different average pilot strength values. The wireless device may compare the average pilot strength against one or more thresholds to determine the warm-up time to use for the next active interval. In general, M+1 warm-up durations may be defined for M thresholds, where M≧1. The warm-up durations are generally shorter for higher average pilot strength. The average pilot strength may be compared against the M thresholds, and one of the M+1 warm-up durations may be selected based on the result of the comparison, as follows:

$$\text{Warm-up Time} = \begin{cases} T_{wu,1} & \text{if } P_{avg}(n) \geq TH_1, \\ T_{wu,2} & \text{if } TH_1 > P_{avg}(n) \geq TH_2, \\ \vdots & \vdots \\ T_{wu,M+1} & \text{if } TH_M > P_{avg}(n), \end{cases} \quad \text{Eq (2)}$$

where $TH_1$ to $TH_M$ are M thresholds, with $TH_1 > TH_2 > \ldots > TH_M$, and $T_{wu,1}$ to $T_{wu,M+1}$ are M+1 warm-up durations, with $T_{wu,1} \leq T_{wu,2} \leq \ldots \leq T_{wu,M+1}$.

In an embodiment, a single threshold is used, a first warm-up duration $T_{wu,1}$ is selected if the average pilot strength exceeds the threshold, and a second warm-up duration $T_{wu,2}$ is selected if the average pilot strength is below the threshold, where $T_{wu,2} > T_{wu,1}$. The wireless device may be able to perform pilot acquisition in a shorter amount of time (e.g., $T_{wu,1}=3$ to 4 ms) for good channel conditions and may need more time (e.g., $T_{wu,2}=10$ ms or more) for poor channel conditions.

In the embodiment described above, the strongest pilot strength measurement in each active interval is averaged. This embodiment assumes that the channel conditions are good if any strong pilot can be received and hence does not distinguish different pilots. The strongest pilot strength measurements for different active intervals may be for the same pilot or different pilots.

In another embodiment, the averaging is performed separately for each pilot, and an average pilot strength is obtained for each pilot. In each active interval, the largest average pilot strength may be compared against the M thresholds, and the warm-up time for the next active interval may be determined based on the comparison result. This embodiment distinguishes different pilots. When a new pilot is received, its average pilot strength is initially low (e.g., set equal to $(1-\alpha) \cdot P(n)$ for the first measurement) and thereafter ramps up. If the wireless device moves to a new location, then all or many of the acquired pilots may be new. The low average pilot strengths after pilot handoff may result in selection of a longer warm-up time.

In another embodiment, the channel conditions are determined based on total received power. The wireless device may measure the total received power in each active interval, average the total received power across active intervals, and compare the average total received power against M thresholds to select one of M+1 warm-up durations. In yet another embodiment, the channel conditions are determined based on received signal quality, which may be quantified by a signal-to-noise ratio (SNR), a signal-to-noise-and-interference ratio (SNIR), and so on. The channel conditions may also be determined based on other parameters or a combination of parameters.

The channel conditions may be determined based on a long-term average of pilot strength, total received power, received signal quality, or some other parameter, as described above. The channel conditions are typically static. The long-term average may improve the accuracy of the prediction of the channel conditions in the next active interval and may further ensure use of a shorter warm-up time when good static channel conditions are observed. In another embodiment, no averaging or short-term averaging is performed.

Operating conditions may affect the amount of time required for warm-up. The operating conditions may determine which tasks to perform for warm-up and/or how the tasks should be performed. The wireless device may perform different tasks for different operating conditions. For example, the wireless device may monitor the paging channels from multiple systems (e.g., 1X and 1xEV-DO systems) operating in different frequency bands or different frequency channels. The wireless device may switch to a new frequency band during warm-up and may need extra time for this band switch. As another example, the wireless device may need less warm-up time for the QPCH than the PCH, e.g., approximately 22 ms for the QPCH and 25 ms for the PCH. The shorter warm-up time for the QPCH may be due to pilot acquisition being less crucial for the QPCH as well as greater tolerance for QPCH decoding error. A QPCH decoding error may result in the PCH being decoded whereas a PCH decoding error may result in loss of a page message. A shorter warm-up time may be selected if the next active interval is for the QPCH. As yet another example, the wireless device may have less CPU time or MIPs available for warm-up in the next active interval, e.g., due to required processing for other tasks. Extra warm-up time may be allocated to account for the reduced processor capability.

In an embodiment, extra warm-up time is allocated for additional task(s) (e.g., frequency band switch) to be performed for warm-up. A list of additional tasks and the amount of time required for each task may be stored, e.g., in a look-up table. The warm-up time for the next active interval may be extended based on the additional task(s) to be performed in the next active interval. In another embodiment, a look-up table stores different warm-up durations for a given task for different conditions.

Hardware configuration of the wireless device may affect the amount of time required for warm-up. Different wireless device models may employ different types of mass storage device such as NAND Flash, NOR Flash, and so on. During warm-up, a software reboot may be performed, and program code may be downloaded from the mass storage device to an internal memory, e.g., a synchronous random access memory (SRAM). The download may take different amounts of time for different mass storage devices. Different wireless device models may also have different processor speed and/or capabilities and may require different amounts of time for warm-up. Different wireless device models may also have different receiver designs and different capabilities for pilot search, pilot acquisition, and/or other tasks.

In an embodiment, warm-up time is determined based on hardware configuration of the wireless device. A look-up table may store warm-up durations for different hardware configurations, which may be identified by a hardware ID, a model number, and so on. A suitable warm-up duration may be selected from the look-up table based on the hardware configuration of the wireless device.

In general, the warm-up time of the wireless device may be determined based on any one or any combination of the conditions given in Table 1. For example, warm-up time may be dependent solely on channel conditions, on hardware configuration, on channel and operating conditions, or on all of the conditions given in Table 1.

Figure 4:
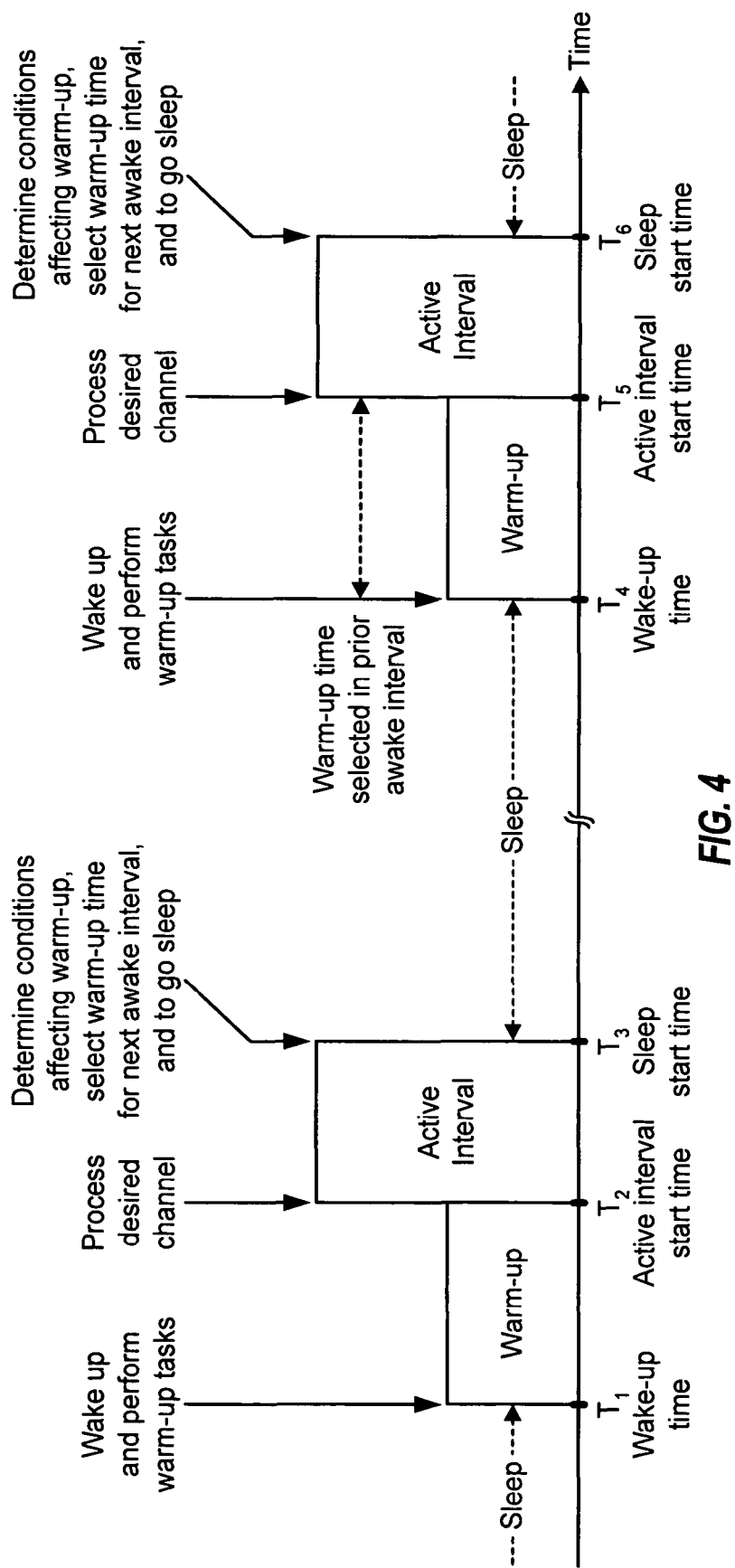
FIG. 4 shows an exemplary timeline for processing the QPCH and/or PCH with dynamically selected warm-up time.

FIG. 4 shows an exemplary timeline for processing a desired channel (e.g., the QPCH or PCH) with dynamically selected warm-up time. At time $T_1$, the wireless device wakes up and performs warm-up tasks. At time $T_2$, the wireless device processes the desired channel. The wireless device determines the conditions affecting warm-up time, e.g., channel conditions, operating conditions, hardware configuration, and so on. The wireless device then selects the warm-up time for the next active interval based on the determined conditions. The wireless device then goes to sleep at time $T_3$ for an amount of time determined by the warm-up time for the next active interval.

The wireless device wakes up at time $T_4$, which is the selected warm-up time prior to the start of the desired transmission. The wireless device performs warm-up tasks starting at time $T_4$ and processes the desired channel starting at time $T_5$. The wireless device determines the conditions affecting warm-up time, selects the warm-up time for the next active interval based on the determined conditions, and then goes to sleep at time $T_6$ for an amount of time determined by the warm-up time for the next active interval.

The techniques described herein allow for use of a shorter warm-up time in many instances. In some instance, the selected warm-up time may be inadequate and may result in decoding error. For example, a page message may be missed if decoded in error. In an embodiment, whenever decoding error occurs, the baseline or worst-case warm-up duration may be selected. In another embodiment, the warm-up time is selected based on the determined conditions as described above and further modified by an adjustment factor. This adjustment factor may be increased by a large step when a decoding error occurs and decreased by a small step otherwise.

Figure 5:
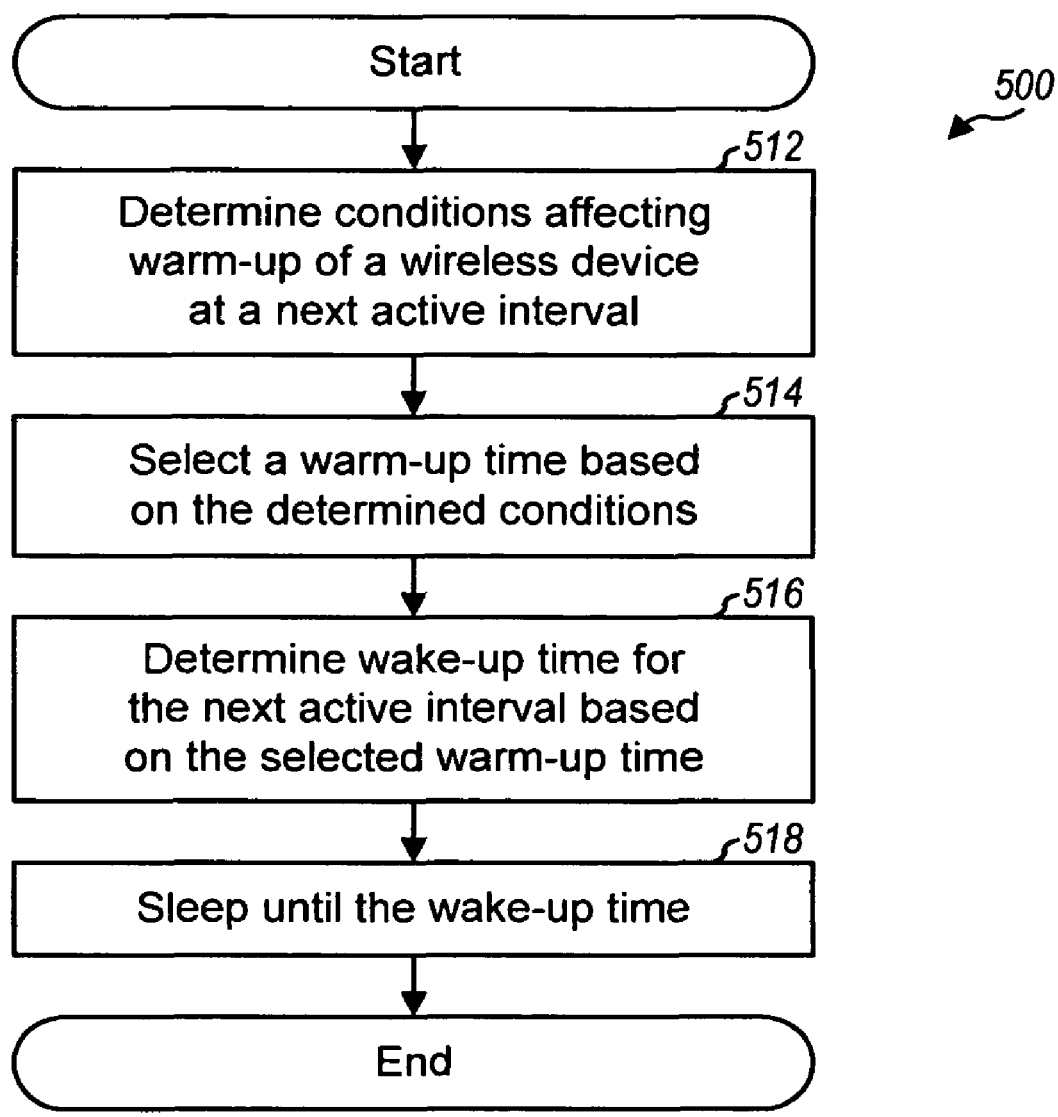
FIG. 5 shows a process for operating in the idle mode.

FIG. 5 shows an embodiment of a process 500 for operating in the idle mode with dynamically selected warm-up time. Conditions affecting warm-up of the wireless device at a next active interval are determined (block 512). The conditions may pertain to channel conditions, operating conditions, hardware configuration, and so on, or any combination thereof. A warm-up time is selected based on the determined conditions (block 514). A wake-up time for the next active interval is determined based on the selected warm-up time (block 516). The wireless device then sleeps until the wake-up time (block 518).

For block 512, pilot acquisition may be performed during warm-up for a current active interval, and pilot strength of at least one pilot may be determined. The strongest pilot may be identified and its pilot strength may be averaged to obtain an average pilot strength. The average pilot strength may be compared against at least one threshold, and one of at least two possible time durations may be selected for the warm-up time based on the result of the comparison. Alternatively, an average pilot strength may be maintained for each pilot. The highest average pilot strength may be used to select the warm-up time. The conditions affecting warm-up may also be determined based on total received power, received signal quality, or some other parameter.

The conditions affecting warm-up may also relate to operating conditions, e.g., whether to switch frequency band at the next active interval, which control channel to receive in the next active interval, and so on. The conditions affecting warm-up may also relate to hardware configuration, e.g., the available processor capacity at the next active interval, the type of memory used for the wireless device, and so on. A control channel (e.g., the paging channel) may be decoded in the current active interval, and the longest supported time duration may be selected for the warm-up time if the message is decoded in error.

Figure 6:
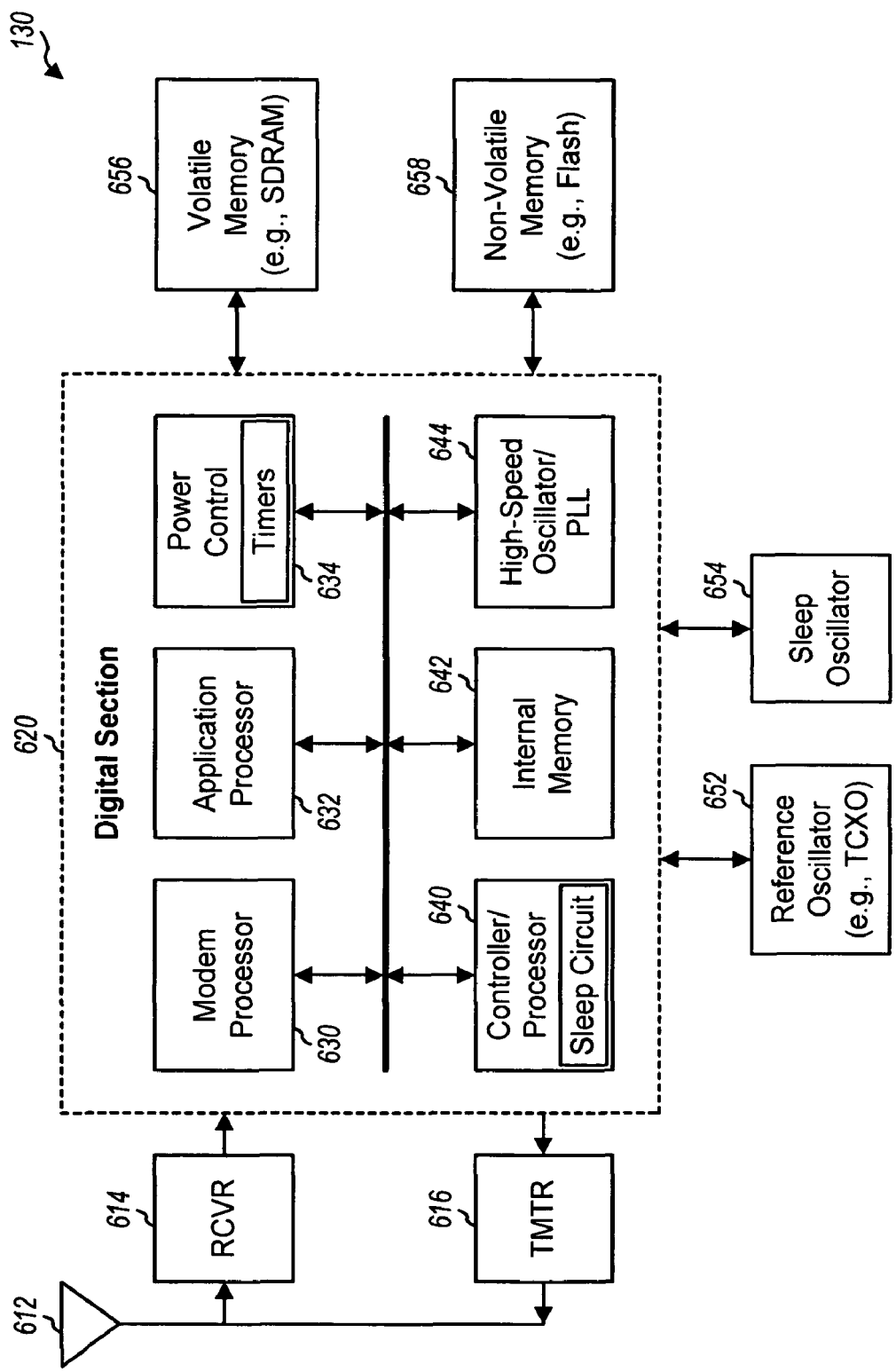
FIG. 6 shows a block diagram of a wireless device.

FIG. 6 shows a block diagram of an embodiment of wireless device 130, which may be any of the wireless devices in FIG. 1. On the receive path, an antenna 612 receives signals transmitted by base stations in one or more systems and provides a received signal to a receiver (RCVR) 614. Receiver 614 conditions (e.g., filters, amplifies, and frequency downconverts) the received signal, digitizes the conditioned signal, and provides data samples to a digital section 620. On the transmit path, digital section 620 processes data to be transmitted by wireless device 130 and provides output chips to a transmitter (TMTR) 616. Transmitter 616 conditions (e.g., converts to analog, filters, amplifies, and frequency upconverts) the output chips and generates a modulated signal, which is transmitted via antenna 612.

Digital section 620 includes various processing units that support communication with one or more systems. In the embodiment shown in FIG. 6, digital section 620 includes a modem processor 630, an application processor 632, a power control unit 634, a controller/processor 640, an internal memory 642, and a high-speed oscillator/phase locked loop (PLL) 644. Modem processor 630 performs demodulation and decoding for the receive path and encoding and modulation for the transmit path. Application processor 632 performs processing for various applications such as, e.g., multi-way calls, web browsing, media player, and user interface. Power control unit 634 controls power to various units within digital section 620. Power control unit 634 may include timers that indicate when to sleep, when to wake up, when to remove power during sleep, and when to apply power during warm-up and active times.

Controller/processor 640 controls the operation of various units within digital section 620. Controller/processor 640 may include a sleep circuit that determines conditions affecting warm-up in the next active interval, selects the warm-up time for the next active interval, and determines the wake-up time for the next active interval, as described above. Internal memory 642 stores data and program code for the processing units within digital section 620. High-speed oscillator/PLL 644 generates high-speed clocks for the processing units within digital section 620.

In the embodiment shown in FIG. 6, digital section 620 further couples to a reference oscillator (e.g., a TCXO) 652, a sleep oscillator 654, a volatile memory 656, and a non-volatile memory 658. Reference oscillator 652 provides an accurate clock used by other oscillators as the reference frequency. Sleep oscillator 654 provides a low-frequency sleep clock used by digital circuitry powered on during sleep. Volatile memory 656 provides bulk storage for data and program code used by digital section 620 and may be implemented with, e.g., an SDRAM. Non-volatile memory 658 provides bulk non-volatile storage and may be implemented with, e.g., a NAND Flash, a NOR Flash, or some other type of non-volatile memory.

The dynamic warm-up techniques described herein may be implemented by various means. For example, these techniques may be implemented in hardware, firmware, software, or a combination thereof. For a hardware implementation, the processing units used to determine warm-up time may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the techniques may be implemented with modules (e.g., procedures, functions, and so on) that perform the functions described herein. The firmware and/or software codes may be stored in a memory (e.g., memory 642 in FIG. 6) and executed by a processor (e.g., processor 640). The memory may be implemented within the processor or external to the processor.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

What is claimed is:

1. A device comprising:
   at least one processor that analyzes one or more conditions that affect an amount of time the device takes to warm-up, wherein the amount of time the device takes to warm-up corresponds to an amount of time the device takes to perform warm-up tasks, and determines the amount of time the device takes to warm-up based on the one or more conditions; and
   a memory coupled to the at least one processor;
   wherein at least one of the one or more conditions relates to a channel condition that affects signal processing time.

2. The device of claim 1, wherein the at least one processor determines the amount of time the device takes to warm-up for each active interval of the device that follows a sleep interval.

3. The device of claim 1, wherein the at least one processor adjusts a wake-up time for a next active interval of the device based on the amount of time the device takes to warm-up.

4. The device of claim 3, wherein the at least one processor wakes up the device at the adjusted wake-up time.

5. The device of claim 1, wherein the one or more conditions include operating conditions that affect warm-up tasks of the device.

6. The device of claim 1, wherein the one or more conditions include hardware configuration conditions that affect processing capability of the device.

7. The device of claim 1,
   wherein the one or more conditions comprises the condition that relates to the channel condition, the channel condition determined based at least in part on pilot strength;
   wherein the at least one processor performs pilot acquisition during warm-up for a current active interval, determines pilot strength of at least one pilot, and determines the amount of time the device takes to warm-up for a next active interval based on the pilot strength.

8. The device of claim 7, wherein the at least one processor determines an average pilot strength, compares the average pilot strength to at least one threshold, and determines the amount of time the device takes to warm-up based on the comparison.

9. The device of claim 1,
   wherein the channel condition is determined based at least in part on pilot strength;
   wherein the at least one processor performs pilot acquisition during warm-up for a current active interval, identifies a strongest pilot acquired during warm-up, determines an average pilot strength based on pilot strength of the strongest pilot, and determines the amount of time the device takes to warm-up for a next active interval based on the average pilot strength.

10. The device of claim 1,
    wherein the channel condition is determined based at least in part on average pilot strength;
    wherein the at least one processor performs pilot acquisition during warm-up for a current active interval, determines at least one average pilot strength for at least one pilot acquired during warm-up, and determines the amount of time the device takes to warm-up for a next active interval based on a highest average pilot strength among the at least one average pilot strength.

11. The device of claim 1, wherein the at least one processor determines the amount of time the device takes to warm-up based on total received power at the device.

12. The device of claim 1, wherein the at least one processor determines the amount of time the device takes to warm-up based on tasks to be performed for warm-up at a next active interval.

13. The device of claim 1,
    wherein the one or more conditions comprises a condition that relates to switching the frequency band;
    wherein the at least one processor determines whether to switch frequency band at a next active interval and determines the amount of time the device takes to warm-up based on a selection of a first time duration for the amount of time the device takes to warm-up if a switch in frequency band is performed and a selection of a second time duration for the amount of time the device takes to warm-up if a switch in frequency band is not performed, the second time duration being shorter than the first time duration.

14. The device of claim 1,
    wherein the one or more conditions comprises a condition that relates to the type of control channel to receive;
    wherein the at least one processor determines the amount of time the device takes to warm-up based on a selection of a first time duration for the amount of time the device takes to warm-up if a quick paging channel is received in a next active interval and a selection of a second time duration for the amount of time the device takes to warm-up if a paging channel is received in the next active interval.

15. The device of claim 1,
    wherein the one or more conditions comprises a condition that relates to the capability of the processor;
    wherein the at least one processor determines available processor capacity at a next active interval, and determines the amount of time the device takes to warm-up based on the available processor capacity.

16. The device of claim 1,
    wherein the one or more conditions comprises a condition that relates to the type of memory;
    wherein the at least one processor determines the memory type used by the device, and determines the amount of time the device takes to warm-up based on the memory type.

17. The device of claim 1, wherein the at least one processor decodes a control channel in a current active interval to obtain a message, and determines a longest supported time duration for the amount of time the device takes to warm-up if the message is decoded in error.

18. The device of claim 1, wherein the one or more conditions comprises a condition that relates to a speed of the one or more processors.

19. The device of claim 1, wherein the one or more conditions comprises a condition that relates to switching the frequency band.

20. The device of claim 1, wherein the one or more conditions comprises a condition that relates to the type of control channel to receive.

21. A method comprising:
    analyzing, using a device, one or more conditions that affect an amount of time the device takes to warm-up, wherein the amount of time the device takes to warm-up corresponds to an amount of time the device takes to perform warm-up tasks; and determining, using the device, the amount of time the device takes to warm-up based on the one or more conditions;
   wherein at least one of the one or more conditions relates to a channel condition that affects signal processing time.

22. The method of claim 21, further comprising adjusting a wake-up time for a next active interval of the device based on the amount of time the device takes to warm-up.

23. The method of claim 22, further comprising waking up the device at the adjusted wake-up time.

24. The method of claim 21,
   wherein the channel condition is determined based at least in part on average pilot strength;
   wherein determining the amount of time the device takes to warm-up comprises determining an average pilot strength, comparing the average pilot strength to at least one threshold, and selecting one of at least two possible time durations for the amount of time the device takes to warm-up based on the comparison.

25. The method of claim 21, wherein the one or more conditions comprises a condition that relates to switching the frequency band;
   wherein determining the amount of time the device takes to warm-up comprises determining whether to switch frequency band at a next active interval, and identifying a first time duration for the amount of time the device takes to warm-up if a switch in frequency band is performed and a second time duration for the amount of time the device takes to warm-up if a switch in frequency band is not performed, the second time duration being shorter than the first time duration.

26. The method of claim 21, wherein the one or more conditions comprises a condition that relates to a speed of the one or more processors.

27. The method of claim 21, wherein the one or more conditions comprises a condition that relates to switching the frequency band.

28. The method of claim 21, wherein the one or more conditions comprises a condition that relates to the type of control channel to receive.

29. An apparatus comprising:
   means for analyzing one or more conditions that affect an amount of time a device takes to warm-up, wherein the amount of time the device takes to warm-up corresponds to an amount of time the device takes to perform warm-up tasks; and
   means for determining the amount of time the device takes to warm-up based on the one or more conditions;
   wherein at least one of the one or more conditions relates to a channel condition that affects signal processing time.

30. The apparatus of claim 29, further comprising means for adjusting a wake-up time for a next active interval of the device based on the amount of time the device takes to warm-up.

31. The apparatus of claim 30, further comprising means for waking up the device at the adjusted wake-up time.

32. The apparatus of claim 29,
   wherein the channel condition is determined based at least in part on average pilot strength;
   wherein the means for determining the amount of time the device takes to warm-up comprises means for determining an average pilot strength, means for comparing the average pilot strength to at least one threshold, and means for selecting one of at least two possible time durations for the amount of time the device takes to warm-up based on the comparison.

33. The apparatus of claim 29,
   wherein the one or more conditions comprises a condition that relates to switching the frequency band;
   wherein the means for determining the amount of time the device takes to warm-up comprises means for determining whether to switch frequency band at a next active interval, and means for identifying a first time duration for the amount of time the device takes to warm-up if a switch in frequency band is performed and a second time duration for the amount of time the device takes to warm-up if a switch in frequency band is not performed, the second time duration being shorter than the first time duration.

34. The apparatus of claim 29, wherein the one or more conditions comprises a condition that relates to a speed of the one or more processors.

35. The apparatus of claim 29, wherein the one or more conditions comprises a condition that relates to switching the frequency band.

36. The apparatus of claim 29, wherein the one or more conditions comprises a condition that relates to the type of control channel to receive.

37. A non-transitory processor-readable storage medium comprising instructions that, when executed, cause one or more processors to:
   analyze, using the one or more processors, one or more conditions that affect an amount of time the device takes to warm-up, wherein the amount of time the device takes to warm-up corresponds to an amount of time the device takes to perform warm-up tasks; and
   determine, using the one or more processors, the amount of time the device takes to warm-up based on the one or more conditions;
   wherein at least one of the one or more conditions relates to a channel condition that affects signal processing time.

38. The non-transitory processor-readable storage medium of claim 37, further comprising instructions that cause the one or more processors to adjust a wake-up time for a next active interval of the device based on the amount of time the device takes to warm-up.

39. The non-transitory processor-readable storage medium of claim 38, further comprising instructions that cause the one or more processors to wake up the device at the adjusted wake-up time.

40. The non-transitory processor-readable storage medium of claim 37,
   wherein the channel condition is determined based at least in part on average pilot strength;
   wherein determining the amount of time the device takes to warm-up comprises determining an average pilot strength, comparing the average pilot strength to at least one threshold, and selecting one of at least two possible time durations for the amount of time the device takes to warm-up based on the comparison.

41. The non-transitory processor-readable storage medium of claim 37,
   wherein the one or more conditions comprises a condition that relates to switching the frequency band;
   wherein determining the amount of time the device takes to warm-up comprises determining whether to switch frequency band at a next active interval, and identifying a first time duration for the amount of time the device takes to warm-up if a switch in frequency band is performed and a second time duration for the amount of time the device takes to warm-up if a switch in frequency band is not performed, the second time duration being shorter than the first time duration.

42. The non-transitory processor-readable storage medium of claim 37, wherein the one or more conditions comprises a condition that relates to a speed of the one or more processors.

43. The non-transitory processor-readable storage medium of claim 37, wherein the one or more conditions comprises a condition that relates to switching the frequency band.

44. The non-transitory processor-readable storage medium of claim 37, wherein the one or more conditions comprises a condition that relates to the type of control channel to receive.

* * * * *